(12) United States Patent
Hori

(10) Patent No.: US 6,246,930 B1
(45) Date of Patent: Jun. 12, 2001

(54) AUTOMATIC GUIDED VEHICLE SYSTEM AND METHOD FOR NAVIGATING AUTOMATIC GUIDED VEHICLE

(75) Inventor: Kikuo Hori, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/290,422

(22) Filed: Apr. 13, 1999

(30) Foreign Application Priority Data

Aug. 6, 1998 (JP) .................................................. 10-236573

(51) Int. Cl.$^7$ ................................. G06F 7/00; G06F 19/00
(52) U.S. Cl. .................................. 701/23; 701/26; 701/2; 701/11; 342/46; 340/901; 340/933; 340/988; 340/425.5
(58) Field of Search ................................... 701/23, 26, 2, 701/11; 342/118, 126, 46, 47; 340/901, 933, 988, 425.5

(56) References Cited

U.S. PATENT DOCUMENTS

| | | | |
|---|---|---|---|
| 4,905,009 | * | 2/1990 | Ulich et al. ........................... 342/118 |
| 5,691,725 | * | 11/1997 | Tanaka ................................. 342/126 |
| 5,923,282 | * | 7/1999 | Honma et al. ......................... 342/118 |
| 5,995,884 | * | 11/1999 | Allen et al. ............................ 701/24 |
| 6,072,421 | * | 6/2000 | Fukae et al. .......................... 342/42 |
| 6,081,223 | * | 6/2000 | Kitahara et al. ........................ 342/70 |
| 6,119,067 | | 9/2000 | Kikuchi ................................. 701/300 |

FOREIGN PATENT DOCUMENTS 6-90042   11/1994   (JP) .

* cited by examiner

Primary Examiner—William A. Cuchlinski, Jr.
Assistant Examiner—Olga Hernandez
(74) Attorney, Agent, or Firm—Armstrong, Westerman, Hattori, McLeland & Naughton, LLP

(57) ABSTRACT

A plurality of reflectors are disposed along a travelling path, an automatic guided vehicle is started up at a position where a laser scanner can recognize four or more reflectors, and data on the angles and distances of the reflectors is obtained. When the first reflector is recognized, there are N possible hypotheses that would specify the reflectors. When a second reflector is recognized, the distance to the first reflector is rational, therefore, there are kN possible hypotheses (k is 10 or less). When a third reflector is recognized, the triangle formed by the three reflectors cioncides with that on a reflector map, therefore, there are mN possible hypotheses (m<1). Then, the present position is estimated according to mN possible hypotheses. The fourth reflector is recognized and the conformity is checked, the present position of the automatic guided vehicle is specified. Its error rate is about equal to the standard deviation obtained from angular resolution/360 degrees x distance resolution/distance between the reflectors. To enable an automatic guided vehicle to be started up without initial position data.

3 Claims, 4 Drawing Sheets

○ : 16 ; REFLECTOR
22 ; TRAVELLING PATH

AUTOMATIC GUIDED VEHICLE SYSTEM AND METHOD FOR NAVIGATING AUTOMATIC GUIDED VEHICLE

FIELD OF THE INVENTION

The present invention relates to an automatic guided vehicle system and a method for navigating an automatic guided vehicle using this system, and more specifically, the present invention relates to the system and method for enabling the present position to be recognized at an arbitrary position without temporarily determining the initial position of automatic guided vehicles.

BACKGROUND OF THE INVENTION

In the prior art, there is a system in which a plurality of reflectors are disposed along the travelling path, and the reflectors are recognized by means of a laser scanner on an automatic guided vehicle to calculate their present position. When three reflectors can be recognized, the present position can be calculated using the principle of triangulation, therefore, the problem with this approach is that concerning whether such recognized reflector is to be specified which of the reflectors on the reflector map. In this case, this problem can be easily solved by assigning identification data such as bar codes to the reflectors, however, such reflectors are expensive and require much time to install. Therefore, in general, the reflectors must be identical.

In order to specify a reflector without assigning identification data to the reflector itself, the start position of an automatic guided vehicle is input to the automatic guided vehicle. First, presuming that the automatic guided vehicle starts from a known position, the recognized reflector is specified at the starting time. In subsequent recognition, the present position is assumed from the previous recognized position, and assuming that the reflector can be recognized for that position is recognized, the reflector is specified.

However, when using this technique, if a reflector is incorrectly recognized, it becomes impossible to recognize the exact position of the automatic guided vehicle, thus making it uncontrollable. In addition, it is time-consuming to input the present position during at the starting time. For example, presuming that the automatic guided vehicle starts up from a specific reset position, the automatic guided vehicle is manually driven and started up to that position, or it becomes necessary to manually input the present position at each position on the site. In any case, such work is time-consuming.

It is an object of the present invention to start up the automatic guided vehicle to an autonomous travelling without initial position data.

It is another object of the present invention to reduce the error rate of the recognized initial position of the automatic guided vehicle to a negligible value.

It is still another object of the present invention to provide a specific technique for obtaining the initial position of the automatic guided vehicle with a very low error rate.

SUMMARY OF THE INVENTION

The present invention is directed to an automatic guided vehicle system wherein a plurality of reflectors are disposed along the travelling path, and the automatic guided vehicle has a laser scanner for obtaining the orientation and distance of reflectors, a reflector map, a means for temporarily specifying three reflectors comparing recognition values of the distances of the recognized three reflectors with the reflector map, and a means for obtaining the present position of the automatic guided vehicle based on the temporary specification.

Preferably, a means for checking the conformity of the temporary specification from the recognition value of the fourth and subsequent reflectors is also provided.

The present invention is directed to a method for navigating automatic guided vehicles wherein a plurality of reflectors are disposed along the travelling path, and the orientation and distance of at least three reflectors are recognized by means of the laser scanner on the automatic guided vehicle, and the recognized distance is compared with the reflector map to temporarily specify the reflectors, and the present position of the automatic guided vehicle is temporarily obtained based on the temporarily specified reflectors, and the present position is obtained by confirming the temporarily obtained present position from the recognition value of the fourth and subsequent reflectors.

In the automatic guided vehicle system of the present invention, with respect to three reflectors recognized by the laser scanner mounted on the automatic guided vehicle, a permissible combination of the reflectors on the reflector map is temporarily specified from information on the distance between the reflector and the laser scanner. Then, in the case where the fourth and subsequent reflectors can be recognized, the reflectors are completely specified using that information. Even if only three reflectors are recognized, in the case where the other summary information on the initial position of the automatic guided vehicle is given, b using such information, and, in the case where the information on the position of the reflector is given, such as which of the left and right of the travelling path of the automatic guided vehicle each reflector is present, by using such information, the present position of the automatic guided vehicle temporarily obtained is confirmed. Therefore, the automatic guided vehicle can be started up without the information on the initial position of the automatic guided vehicle.

Here, in the case where the fourth end subsequent reflectors can be recognized, the additional information obtained by that are an orientation and a distance, and in general, the laser scanner provides very high anglular resolution, therefore, it can eliminate errors thoroughly. Moreover, if the information on the distance of the fourth reflector is used, the present position can be recognized with greater precision. In the case where the fourth and subsequent reflectors can be recognized, with respect to the fourth and subsequent reflectors, the present position can be recognized by using only an angle information instead of by using the information on both angle and distance.

In addition, the term "three reflectors" or the term "foruth and subsequent reflectors" does not limit to use the firstly recognized three reflectors for temporary position precognition, and to use the fourth and subsequent recognized reflectors for confirming the conformity. For example, in the case where four reflectors are recognized, the second reflector may be used for confirming the conformity, and the present position may be temporarily specified by the first, third and fourth reflectors.

In the present invention, in the case where the automatic guided vehicle can be transferred to autonomous travelling without the initial position information, and in the case where there arises a problem concerning the present position of the automatic guided vehicle after starting autonomous travelling, the position of the automatic guided vehicle can again be precisely obtained. Therefore, the present invention eliminates the problem of having to start up the automatic guided vehicle at only a specific position and of having to input the exact initial position to the automatic guided vehicle.

DETAILED DESCRIPTION OF THE PREFERRED EMBODIMENTS

FIGS. 1 to 6 show an embodiment of the present invention.

Figure 1:
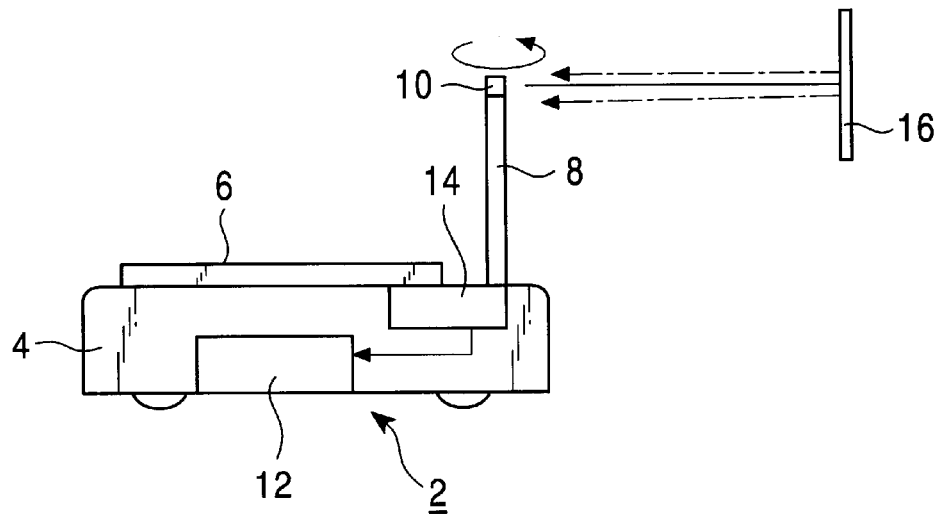
FIG. 1 is a side view of an automatic guided vehicle employed in an embodiment of the present invention.

FIG. 1 shows the structure of an automatic guided vehicle 2. 4 is a vehicle body thereof, 6 is a lifter for loading and elevating article, 8 is a frame for loading a laser scanner 10, 12 is a travel control section, and 14 is a present position recognizing section. The laser scanner 10 rotates a 10 Hz, for example, and detects light reflected from a reflector 16, thereby obtaining the distance and orientation of the reflector 16. The angular resolution of the reflector 16 is 0.1 degrees or less, and the distance resolution is about 1 meter.

Figure 2:
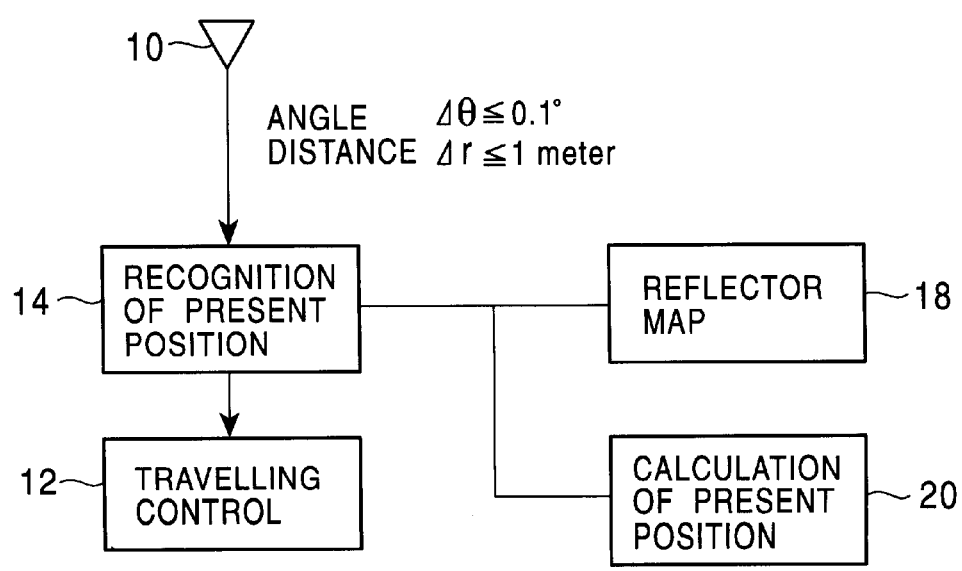
FIG. 2 is a block diagram depicting a control system for the automatic guided vehicle employed in the embodiment.

FIG. 2 shows the control system of the automatic guided vehicle 2. The present position recognizing section 14 is given angle and distance data for a reflector recognized by the laser scanner 10, and calculates the present position and orientation of the automatic guided vehicle 2. As subsystems of the present position recognizing section 14, a reflector map 18 is provided to store the positions of reflectors along the travelling path, and a present position calculation section 20 is provided to calculate the present positions based on data from the map 18 and data from the laser scanner 10. In addition, the present position calculation section 20 not only calculates the present position, but also checks the conformity of the present position calculated and specifies which reflector on the map 18 corresponds to the reflector that the laser scanner 10 has recognized.

Figure 3:
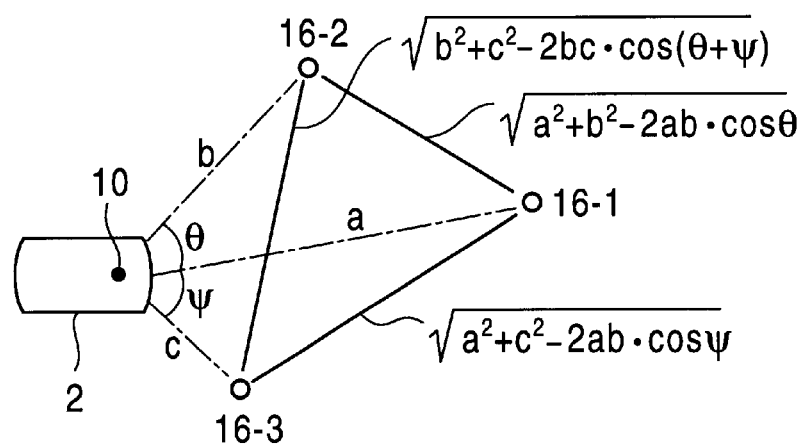
FIG. 3 is a characteristic view showing a process for specifying a reflector employed in the embodiment.

FIG. 3 shows a temporary specification of reflectors when three reflectors from 16-1 to 16-3 are recognized in order. Assuming that the distance to the first reflector 16-1 is (a), the distance to the second reflector 16-2 is (b), and the angle between these reflectors is θ, the distance between the reflectors 16-1 and 16-2 can be obtained from (a), (b) and angle θ by using the cosine theorem. Since the distance resolution between the distance (a) and the distance (b) is about 1 meter, the precision of the distance between the two reflectors 16-1 and 16-2 is about 1.4 meters. Next, when a third reflector 16-3 is recognized, the length of each side of the triangle formed b the three reflectors 16-1 to 16-3 is defined, and the shape of this triangle is completely defined.

Figure 4:
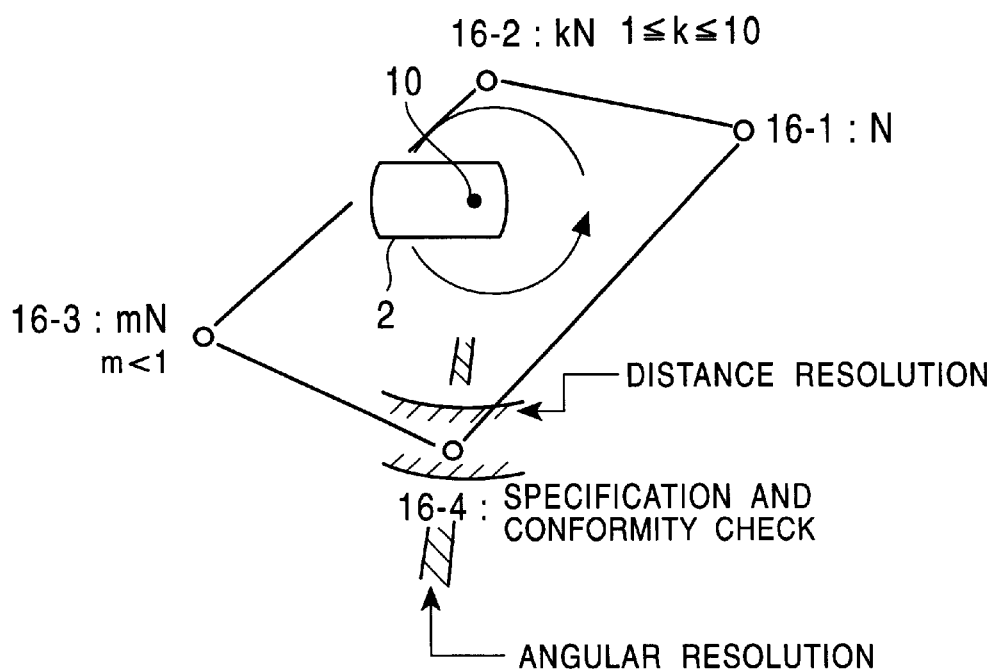
FIG. 4 is a characteristic view showing a process for specifying a reflector employed in the embodiment.

FIG. 4 shows an recognition algorithm for the specification of the reflector and the present position of an automatic guided vehicle 2 when, for example, four reflectors are recognized. Let us assume that N reflectors exist along the travelling path. Since the initial position of the automatic guided vehicle 2 is not assumed, it is possible to assign N ways to this reflector. Next, when a second reflector 16-2 is recognized, the second reflector must exist within a pre-specified distance from the first reflector, and the distance resolution is about 1.4 meters. For example, if the reflectors are disposed an average of 10 meters apart from each other, and the standard deviation of the distance between the reflectors is 5 meters, assuming that the reflectors are distributed substantially uniformly within the range of the standard deviation, it is possible to narrow the candidate of a second reflector with a probability of up to 1/7 in the reflector in the most vicinity of the first reflector if the distance between the first and second reflectors can be recognized at a precision of 1.4 meters. At this time, a hypothesis concerning the determination of the recognized two reflectors has kN ways (k is the value from 1 to 10, but probably closer to 1).

Then, when the third reflector 16-3 is recognized, the triangle formed by the three reflectors 16-1 to 16-3 must coincide with any of the triangles on the reflecto map 18. At this time, the number of combinations of candidates for the three reflectors decreases, the possibility is mN ways (m<1), and the number of candidates can be significantly narrowed down. For example, the present position of the automatic guided vehicle 2 is obtained with respect to candidates of mN ways based on well-known principles of triangulation. If there is information on the angle formed by the three reflectors 16-1 to 16-3, the position and orientation of the automatic guided vehicle 2 can be readily specified by conventional means. If necessary, with respect to the present position of the automatic guided vehicle obtained for the mN ways, the distance between the three reflectors 16-1 to 16-3 is calculated and compared with the recognition value measured by the laser scanner 10, and the hypothesis for specifying the tree reflectors is further narrowed.

For example, in the case where there is a small total number of reflectors, or in the case where an approximate value of the initial position is input to the automatic guided vehicle 2 (the block number when the travelling path is divided into about 10 blocks, for example), or in the case where additional information on whether each reflector is seen on the right side in front of the travelling path or on the left side is input, the three reflectors can be specified rather accurately at this time. Assuming that the distance resolution between the reflectors is about 1.4 meters and the standard deviation of the interval between the reflectors is about 5 meters, the value for k is about 1 at the time when the second reflector is recognized, and the value of m is about 1/10 at the time when the third reflector is recognized, and in addition, when the distance between the automatic guided vehicle 2 and each reflector is checked after the calculation of the present position, the value for m is about 1/100. Here, if there is a general data on the initial position of the automatic guided vehicle 2 or on additional data such as discrimination of whether each reflector is seen on the right or left side of the travelling path, the value for m is smaller than 1/100, and in a small scale automatic guided vehicle system, three reflectors can be almost specified on the map 18.

When the number of reflectors is increased by about 30%, it is possible to change the condition wherein three reflectors can be recognized into a condition wherein four or more reflectors can be recognized. In the case where the fourth reflector is recognized, it is possible to first check the conformity of previous recognized reflectors for whether was correct or not with respect to angular resolution. As described above, the angular resolution is 0.1 degree or less, and the probability that the fourth reflector accidentally would be found in this range is $1/1000$ or less, and its conformity can be checked with a high level of certainty. The interval resolution for the fourth reflector is about 1 meter, as mentioned above, thereby making it possible to further check conformity. At the point when the fourth reflector is recognized, the reflector can be detected almost certainly from a practical standpoint.

Figure 5:
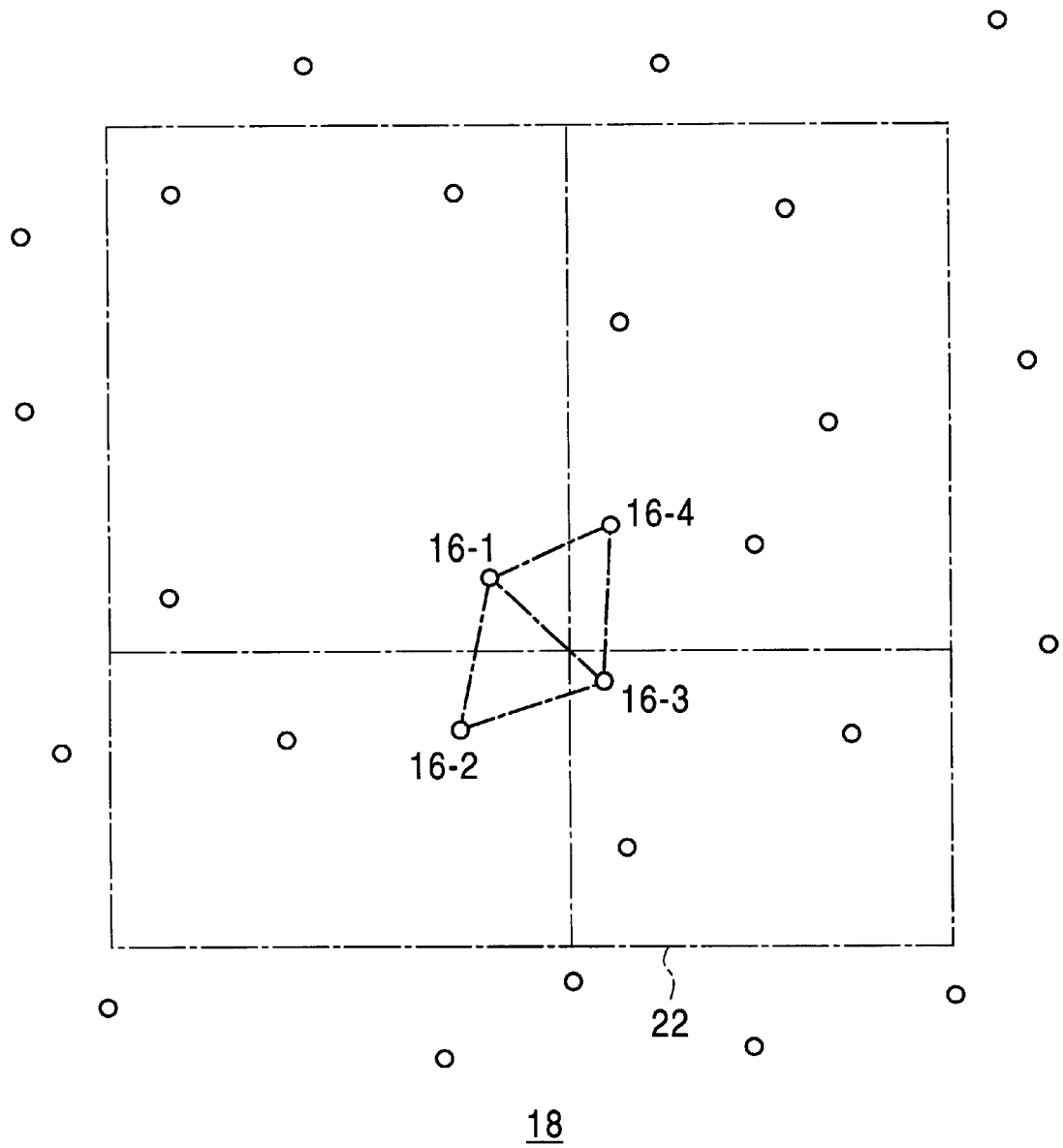
FIG. 5 is a view showing the disposition of reflectors in the embodiment.
Figure 6:
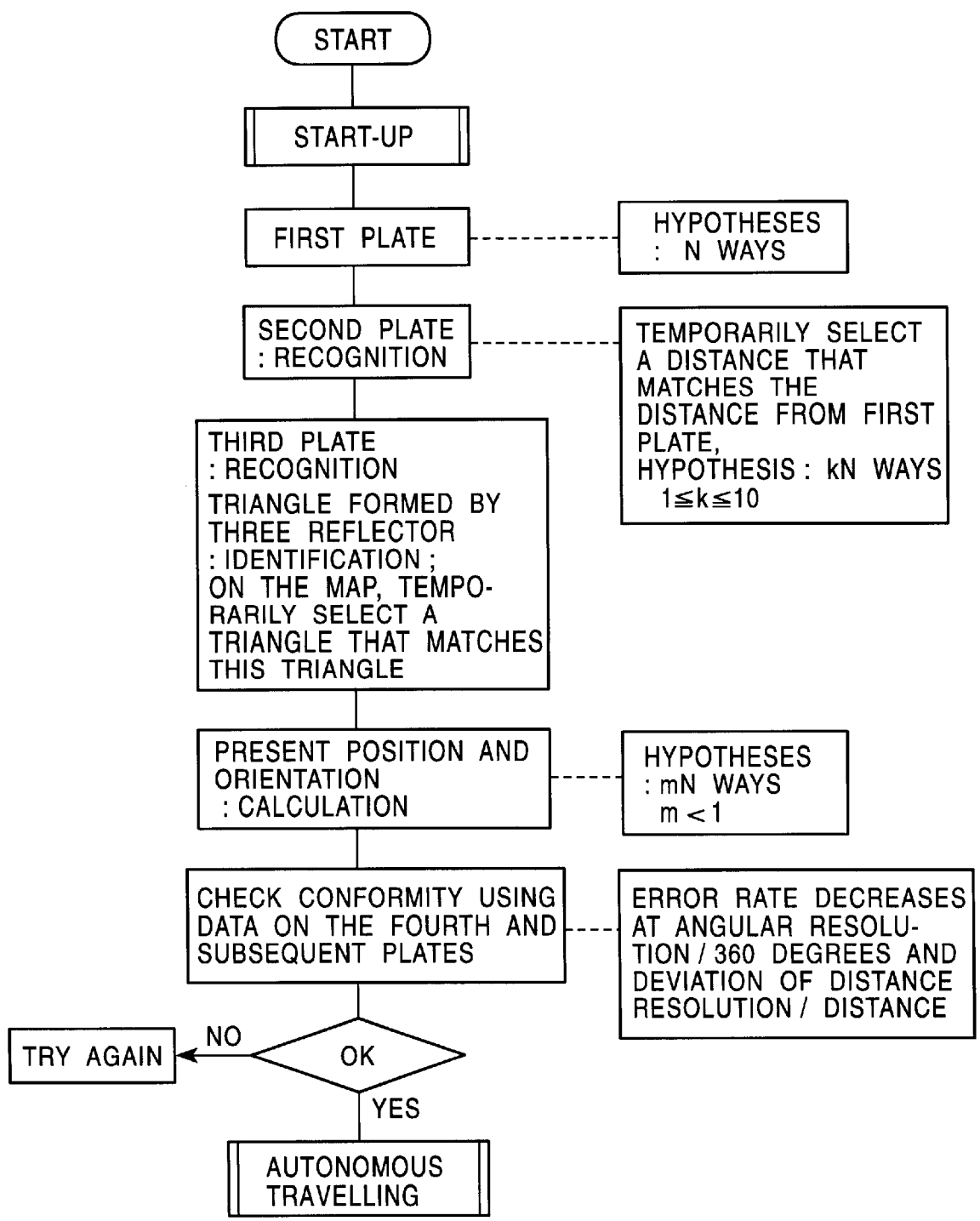
FIG. 6 is a flowchart showing a process for specifying the present position of an automatic guided vehicle in the embodiment.

FIGS. 5 and 6 show a process for recognizing the present position of the automatic guided vehicle in the embodiment. FIG. 5 shows the travelling path and the disposition of the reflector (indicated by a circle ◯). For example, at the time when three reflectors are recognized, the triangle formed by these reflectors almost cinides with the reflectors 16-1 to 16-3 in FIG. 5. Another triangle nearly identical to the triangle does not exist in FIG. 5. When the fourth reflector is added, a quadrilateral identical to that formed by these four points does not exist in FIG. 5. Thus, if there is information concerning the distance between each of these reflectors and the laser scanner 10, using three or more reflectors, it is clear that he reflector can be almost specified.

FIG. 6 shows a process for specifying a reflector. Let us assume that the automatic guided vehicle 2 can be started up at an arbitrary position along the travelling path, or that a plurality of positions at which four or more reflectors can be recognized are provided along the travelling path. And Let us further assume that the automatic guided vehicle 2 is started up by either positions mentioned above. At the time when the first reflector is recognized, assuming that the total number of reflectors 16 residing on the travelling path is N, the hypotheses concerning specification of the reflectors are N ways. Next, when the second reflector is recognized, the distance between the first and second reflectors that substantially coincides with the distance obtained by the technique shown in FIG. 3 is selected. At this time, the hypotheses concerning combinations of the first and second reflectors are kN ways, where k is between 1 and 10 but actually substantially closer to 1. Consequently, when the third reflector is recognized, the shape of the triangle formed by these three reflectors is defined, and only triangles having largely the same shape will remain as candidates for determining the reflectors based on the reflector map of FIG. 5. As a result, the range of hypotheses concerning specification of the reflectors are further limited.

Thus, the hypotheses concerning specification of the reflectors are limited to an extend such that calculation is not made complicated, and the present position and orientation of the automatic guided vehicle 2 is calculated with respect to the remaining hypotheses. For example, if the hypotheses of 10 ways still remain, 10 possible combinations are obtained for the present position and orientation of the automatic guided vehicle. If necessary, the distance measured between the laser scanner 10 and each reflector is compared with a calculated value of the distance obtained by each hypotheses, and unreasonable hypotheses are eliminated. Therefore, at this time, there are mN possible solutions for the present position and orientation of the automatic guided vehicle, where m is substantially smaller than 1.

Here, the fourth and subsequent reflectors are further recognized, and the conformity of hypotheses of mN ways is checked from the recognized angle and distance. There error rate is roughly obtained by multiplying the ratio of the angle resolution of the laser scanner 10 to 360 degrees by the ratio of the distance resolution of the laser scanner 10 to the standard deviation of the interval between the reflectors, and this value is sufficiently smaller than $1/1000$. Therefore, when four reflectors can be recognized, the error rate for identifying the recognized reflectors is $1/1000$ or less. Assuming that the fifth and subsequent reflectors can be recognized, the conformity is further checked, or example, by whether the error obtained by the least squares method for the present position obtained from the angle and distance with respect to five reflectors is within a prespecified range is not checked. In the case where the conformity is not sufficient, another attempt is made after the position of the automatic guided vehicles changes. If conformity is checked successfully, the automatic guided vehicle then goes to autonomous travelling. In autonomous travelling, the present position thus obtained becomes the initial position, the reflector thus specified becomes the first observed reflector, and subsequently, the reflector specification is repeated based on this information. In other words, the laser scanner 10 performs scanning at a frequency of about 10 Hz, and because the distance traveled by the automatic guided vehicle 2 in the period between scans is substantially less than 1 m, it is as if each reflector were observed consecutively. As a result, with respect to combinations of the previously recognized reflectors, in the next recognition, a reflector within a prespecified angle and distance from previously measured angle and distance values is specified as the same reflector as the previous one. If there is a new reflector, it is sought to be identified by referring to the reflector map 18. When a reflector is thus identified, the present position thereof is recognized based on the identification.

What is claimed is:

1. A method for navigating an automatic guided vehicle comprising;

disposing a plurality of reflectors along a travelling path;

recognizing an orientation and a distance of at least three reflectors;

temporarily determining said reflectors by comparing the recognized distance with a reflector map storing positions of the reflectors along the travelling path;

obtaining a present position of the automatic guided vehicle on the basis of the temporarily specified reflector; and obtaining the present position by confirming the temporarily obtained present position from the recognition values of the fourth and subsequent reflectors.

2. An automatic guided vehicle system comprising:

a plurality of reflector disposed along a travelling path;

an automatic guided vehicle including laser scanner for obtaining an orientation and a distance of the reflectors;

a reflector map storing positions of the reflectors along the travelling path;

a means for determining temporary specification of three reflectors by comparing recognition values of distances with respect to the recognized three reflectors with the reflector map; and a means for obtaining a present position of the automatic guided vehicle based on the temporary specification.

3. The automatic guided vehicle system as claimed in claim 2, further comprising a means for checking conformity of said temporary specification based on a recognition values of fourth and subsequent reflectors.

* * * * *